June 7, 1932.  J. A. RATTA  1,861,549
VEHICLE CHOCK
Filed June 24, 1931

INVENTOR
J. A. Ratta
BY
ATTORNEY

Patented June 7, 1932

1,861,549

UNITED STATES PATENT OFFICE

JAMES A. RATTA, OF BROOKLYN, NEW YORK, ASSIGNOR TO AMERICAN TELEPHONE AND TELEGRAPH COMPANY, A CORPORATION OF NEW YORK

VEHICLE CHOCK

Application filed June 24, 1931. Serial No. 546,646.

This invention relates to improvements in vehicle chocks, and has for its principal object to provide a chock for preventing sliding, backward or forward movement of a vehicle under heavy pull on a roadway or the like when desired.

Another object consists in the provision of a simple, efficient and comparatively inexpensive arrangement of the above character.

A further object consists in a chock adapted for chocking a vehicle on a hill or on slippery or icy surfaces.

These and further objects will be apparent from the following description, when considered in connection with the accompanying drawing in which one modification of the invention is illustrated.

Figure 1:
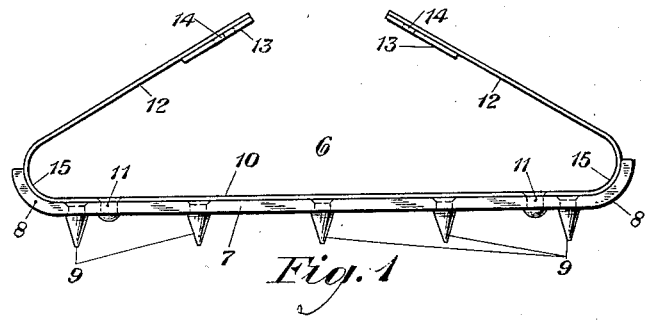
Figure 2:
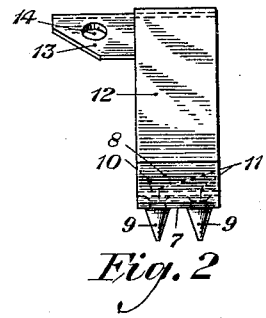
Figure 3:
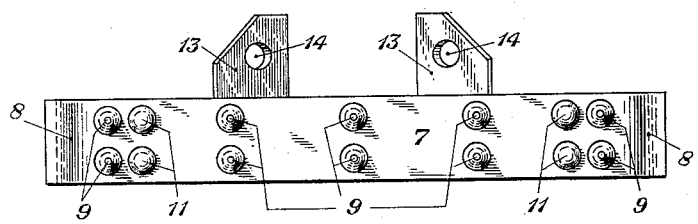
Figure 4:
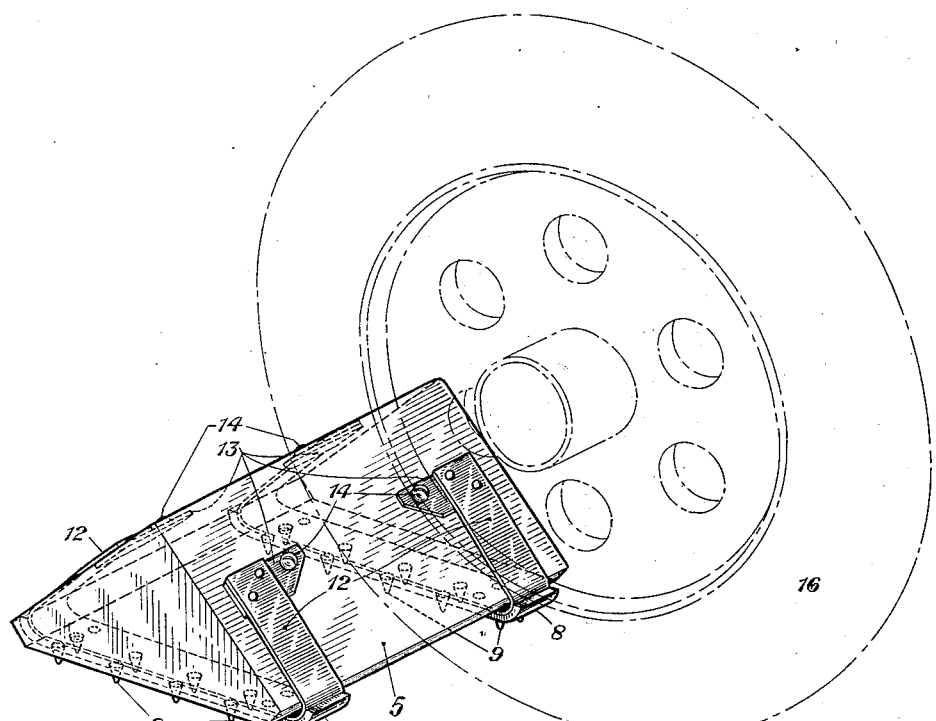

Referring to the drawing in which the improved device is illustrated, Figure 1 is a side elevation of the frame element of the chock, shown as detached from its support; Figs. 2 and 3 are end and bottom views, respectively, of Fig. 1, and Fig. 4 is a perspective view illustrating a vehicle wheel held against movement by means of an applied chock, in accordance with this invention.

The improved device as illustrated in the drawing comprises the supporting element 5 and a frame member 6. The element 5 provides a support, and while shown in the present instance as being in the form of a triangular block which may be made of wood, may be of other form and made of other material. The frame element 6 is adapted to be mounted and attached to the element 5 in a manner which will be presently described.

The frame 6, includes a base 7, which may be made of mild steel or the like, and comprises an elongated bar having upwardly curved end portions 8. Calks or spurs 9, suitably arranged and spaced from each other are riveted or otherwise securely attached to the base 7 so that they project downwardly therefrom when the frame is in position. A strap 10 of resilient metal is mounted on the base 7, and is secured thereto by rivets 11 or the like. The member 10 is of a width corresponding to the width of the base 7, and is provided with resilient arms 12 which are shown in their normal and unflexed position in Fig. 1 of the drawing. The arms 12 have tabs or perpendicular extensions 13 riveted to their extremities, and are provided with openings 14 through which screws or nails may pass to attach the members 5 and 6 together. The tabs 13 provide lever arms which may be readily grasped to facilitate placing the frame 6 in position on the block 5.

The junction points 15 between the strap 10 and its resilient arms 12 are rounded to conform to the curvature of the ends 8 of the base so that they may be seated therein. The curved ends 8 of the base provide reenforcement for the resilient arms at their flexure points 15.

The frame 6 is attached to the supporting block 5 in a variety of ways. For instance one method of attachment may be by way of grasping the tabs 13 to spread the resilient arms 12 outwardly so that the said frame may be pushed over either end of the supporting block 5. When so placed they assume the position indicated in Fig. 4. The base of the frame 6 will lie against the flat bottom surface of the supporting block 5 when the member 6 is positioned on said block and the resilient arms 12 will grip the two inclined or sloping sides thereof. As shown in Fig. 4, nails or screws when necessary may be inserted through the openings 14 of the resilient arms to maintain the frame member 6 in position. With the members 5 and 6, thus attached to each other, either of the inclined surfaces of the chock may be applied forwardly or rearwardly of a wheel 16, depending upon which side chocking action is required. The calks 9 will so engage or grip slippery, icy or inclined surfaces of a roadway that the backward or forward movement of a vehicle is prevented. The member 6 may be readily attached or detached from the block 5 and the latter member may be used independently if desired to chock the vehicle wheels on a smooth roadway or where only a minimum chocking action is required.

What is claimed is:

1. A vehicle chock including a support, a frame member detachably mounted on said support, and calk members carried by the frame member for engaging road surfaces.

2. A vehicle chock including a support and a frame member mounted thereon, said frame member having a base portion engaging one side of the support and resilient arms extending from the base portion to grip other sides of the support, and being secured thereto, and calk members carried by the frame member for engaging road surfaces.

3. A vehicle chock including a support having a bottom surface and two inclined surfaces, a frame member mounted on the support and having a base for engaging the bottom surface of the support and resilient arms extending from the base for engaging the inclined surfaces of the support, and a plurality of calk members carried by the base of the frame member for engaging road surfaces.

4. A wheel chock for vehicles including a support having a flat bottom surface and two inclined surfaces, a frame member conforming to the shape of the support and being detachably mounted thereon, and calk members carried by the frame member for engaging road surfaces to prevent movement of the chock and the vehicle to which it is applied.

5. A vehicle chock including a substantially triangular support, a frame member conforming to the shape of the support and being attachably mounted thereon, said member having a base portion engaging the bottom side of the support and resilient arms extending from the base portion and engaging the other sides of the support, and calk members carried by the frame member in spaced relation to each other for engaging road surfaces.

In testimony whereof, I have signed my name to this specification this 22nd day of June, 1931.

JAMES A. RATTA.